United States Patent
Malinverno et al.

(10) Patent No.: US 6,549,854 B1
(45) Date of Patent: Apr. 15, 2003

(54) UNCERTAINTY CONSTRAINED SUBSURFACE MODELING

(75) Inventors: Alberto Malinverno, Blauvelt, NY (US); Michael Prange, Danbury, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/502,920

(22) Filed: Feb. 11, 2000

Related U.S. Application Data

(60) Provisional application No. 60/165,333, filed on Nov. 12, 1999, and provisional application No. 60/119,821, filed on Feb. 12, 1999.

(51) Int. Cl.⁷ .................................. G01V 1/30
(52) U.S. Cl. .......................... 702/16; 702/5; 702/6; 367/73
(58) Field of Search .............. 700/98, 97; 367/73; 175/45, 50; 702/5, 6, 16

(56) References Cited

U.S. PATENT DOCUMENTS

| | | | | |
|---|---|---|---|---|
| 4,340,934 A | | 7/1982 | Segesman | 364/422 |
| 4,679,174 A | * | 7/1987 | Gelfand | 367/38 |
| 5,103,920 A | * | 4/1992 | Patton | 175/45 |
| 5,321,613 A | | 6/1994 | Porter et al. | 364/420 |
| 5,416,750 A | | 5/1995 | Doyen et al. | 367/73 |
| 5,539,704 A | | 7/1996 | Doyen et al. | 367/73 |
| 5,648,937 A | * | 7/1997 | Campbell | 367/27 |
| 5,838,634 A | | 11/1998 | Jones et al. | 367/73 |
| 5,905,657 A | | 5/1999 | Celniker | 364/578 |

FOREIGN PATENT DOCUMENTS

| | | | | |
|---|---|---|---|---|
| FR | 2 755 244 | 4/1998 | | G01V/1/34 |
| WO | WO98/27498 | 6/1998 | | G06F/17/30 |

OTHER PUBLICATIONS

Duijndam, A.J.W. Bayesian Estimation in Seismic Inversion. Part I: Principles and Part II: Uncertainty Analysis. *Geophysical Prospecting* 36 (1988) pp. 878–898.

Gardner, G.H.F. et al. Formation Velocity and Density–The Diagnostic Basics for Stratigraphic Traps. *Geophysics*, vol. 39, No. 6 (Dec. 1974). pp. 770–780.

Gouveia, Wences P. and Scales, John A. Bayesian Seismic Waveform Inversion: Parameter Estimation and Uncertainty Analysis. *Journal of Geophysical Research*. vol. 103, No. B2 (Feb. 10, 1998). pp. 2759–2779.

Mosegaard, Klaus and Tarantola, Albert. Monte Carlo Sampling of Solutions to Inverse Problems. *Journal of Geophysical Research*. vol. 100, No. B7. (Jul. 10, 1995) pp. 12,431–12,447.

Sen, Mrinal K. and Stoffa, Paul L. Bayesian Inference, Gibbs' Sampler and Uncertainty Estimation in Geophusical Inversion. *Geophysical Prospecting*. vol. 44 (1996) pp. 313–350.

(List continued on next page.)

*Primary Examiner*—Leo Picard
*Assistant Examiner*—Alexander Kosowski
(74) *Attorney, Agent, or Firm*—William B. Batzer; John J. Ryberg

(57) ABSTRACT

A method, apparatus, and article of manufacture are provided that use measurement data to create a model of a subsurface area. The method includes creating an initial parameterized model having an initial estimate of model parameter uncertainties; considering measurement data from the subsurface area; updating the model and its associated uncertainty estimate; and repeating the considering and updating steps with additional measurement data. A computer-based apparatus and article of manufacture for implementing the method are also disclosed. The method, apparatus, and article of manufacture are particularly useful in assisting oil companies in making hydrocarbon reservoir data acquisition, drilling and field development decisions.

21 Claims, 5 Drawing Sheets

OTHER PUBLICATIONS

Tarantola A. and Valette, B. Inverse Problems=Quest for Information. *Journal of Geophysics.* vol. 50 (1982) pp. 159–170.

Tarantola, Albert and Valette, Bernard. Generalized Nonlinear Inverse Problems Solved Using the Least Squares Criterion. *Reviews of Geophysics and Space Physics.* vol. 20, No. 2 (May 1982) pp. 219–232.

Tarantola, Albert. Inverse Problem Theory—Methods for Data Fitting and Model Parameter Estimation. Chapter 3: *Monte Carlo Methods.* Elsevier Science Publishers, New York, New York (1987) pp. 167–185.

* cited by examiner

UNCERTAINTY CONSTRAINED SUBSURFACE MODELING

RELATED APPLICATIONS

This application claims the benefit of U.S. Provisional Application No. 60/119,821, filed Feb. 12, 1999, and U.S. Provisional Application No. 60/165,333, filed Nov. 12, 1999.

BACKGROUND OF THE INVENTION

This invention is related to subsurface modeling, and is more particularly concerned with a parametric subsurface modeling method, apparatus, and article of manufacture that use uncertainty estimates of subsurface model parameters.

Subsurface models are typically created by geoscientists and engineers to allow development strategies for the subsurface area to be evaluated. Models of this type are commonly created in connection with the development of hydrocarbon reservoirs and mining sites, but they can also used during drilling and related activities where the physical properties of the subsurface area are important. This patent application will focus on the process of creating and updating a model of a subsurface hydrocarbon reservoir, but it should be understood that this merely represents one specific example of how a model of any subsurface area may be created and updated.

Currently, hydrocarbon reservoir modeling is performed most commonly in high-risk, high-profile situations. Typical applications include discoveries in new areas, deepwater exploration, fields in which production surprises or drilling hazards have been encountered, fields in which secondary and tertiary recovery activities are planned, and fields which are being considered for sale or abandonment. The failure to adequately model hydrocarbon reservoirs can have numerous adverse financial consequences, including inaccurate reserve calculations, drilling or completion problems, improper production facility sizing, and suboptimal well placement.

The general problem addressed by this invention is how to construct a model of a subsurface area that is in agreement with multiple sets of measurement data. A model that is in agreement with all of the measurement data obtained from the reservoir can help address many of the problems noted above. By 'reservoir model' we mean a quantitative parameterized representation of the subsurface in terms of geometries and material properties. The geometrical model parameters will typically identify geological boundaries, such as contacts between different geologic layers, faults, or fluid/fluid interfaces. The material model parameters will typically identify properties of distributed subsurface materials, such as seismic wave velocities, porosities, permeabilities, fluid saturations, densities, fluid pressures, or temperatures.

By 'agreement' we mean that the data predicted from the reservoir model fit measurements made on the actual reservoir (seismic data, drilling data, well logging data, well test data, production history data, permanent monitoring data, ground penetrating radar data, gravity measurements, etc.). Virtually all types of measurement data have quantifiable uncertainties and the reservoir model agrees with the measurement data when the difference between data predicted by the reservoir model and measurement data obtained from the reservoir is less than this inherent measurement uncertainty. While creating a reservoir model that fits one data set is a relatively straightforward task, it is much more difficult to ensure that the model is in agreement with multiple data sets, particularly if the data sets consist of different types of data.

A reservoir model, however, is nonunique even if it is made to fit a variety of data, because different values of material properties and geometries within the model can result in similar predicted measurement values. In other words, the reservoir model has inherent uncertainties: each of the numerical parameters in the reservoir model (e.g., values of material properties within a layer) can take a range of values while the model remains in agreement with the data. This range in parameter values is the uncertainty associated with the reservoir model. The invention described herein is a method to integrate information from multiple measurements and to obtain a reservoir model with quantitative uncertainties in the model parameters. A model of the reservoir that fits the data and has quantified uncertainties can be used to assess the risk inherent in reservoir development decisions (e.g., deciding on the location of additional wells) and to demonstrate the value of additional measurements by showing how these measurements decrease uncertainties in model parameters of interest (e.g., the location of a drilling target or hazard).

A Shared Earth Model (SEM) is a geometrical and material property model of a subsurface area. The model is shared, in the sense that it integrates the work of several experts (geologists, geophysicists, well log analysts, reservoir engineers, etc.) who use information from a variety of measurements and interact with the model through different application programs. Ideally, the SEM contains all available information about a reservoir and thus is the basis to make forecasts and plan future actions.

Yet, in any practical case, the information in the measurements is not sufficient to uniquely constrain the parameters (geometries. and material properties) of a SEM. As noted above, any SEM has an associated uncertainty, defined here as the range that model parameters can take while fitting available measurements.

The invention has two primary aspects. The first aspect is a method to quantify and update model parameter uncertainties based on available measurements. One embodiment of this method is based on Bayes' rule, with SEM uncertainty quantified by a posterior probability density function (PDF) of the model parameters, conditioned on the measurements used to constrain the model. This posterior PDF may be approximated by a multivariate normal distribution, which is fully described by the posterior mean and covariance matrix of the SEM parameters. Alternatively, one can use a Monte Carlo method to obtain a sample of models drawn from the posterior PDF. This sample of models spans the uncertainty implied by the measurements.

The second aspect is how such a measure of uncertainty acts as a 'memory' of the SEM and can be used for consistent model updating. Quantified uncertainties provide a mechanism to ensure that updates of the SEM based on new data (e.g., well data) are consistent with information provided by data examined previously (e.g., surface seismic data). In particular, we show through a simple example how the effects of a local update of the model can be propagated using the posterior covariance matrix of the SEM parameters. We also show how to update a sample of models obtained by the Monte Carlo method to include new information.

The ideal of a SEM is that all specialists should be able to interact with a common geometry and material property model of the reservoir, incorporating changes into the model using measurements from their own domain of expertise, while maintaining model consistency with previous measurements. This SEM representation would always be consistent with all available information and should be easy to update as soon as new measurements become available (e.g., from additional wells). Model building would not be a task done episodically, but instead the reservoir model would evolve incrementally as more and more information becomes available during development and production.

While acquiring more measurements can reduce uncertainty, it is important to weigh the cost of data acquisition against the benefits of reducing uncertainty. This can be done using the tools of decision theory, where different decisions are compared given their associated gains/costs and current uncertainties. A consistent quantification of uncertainties can assist oil companies in making data acquisition, drilling, or development decisions.

Currently, reservoir models are simply modified to fit new data and confirming that the modification is not inconsistent with the previously obtained measurement data is left up to the discretion of the user. The reservoir model may be the result of years of effort and may incorporate measurement data from a wide variety of sources. A user will often only confirm that the change made is not inconsistent with the measurement data within his or her area of expertise (a well log analyst may confirm, for instance, that the change made is consistent with the other well logging data, but may not determine whether the change has introduced an inconsistency with the seismic or geologic data from the area). Many reservoir simulations rely heavily on production data from wells and only four types of geological or geophysical reservoir information: structure of the top of the reservoir, reservoir thickness, porosity, and the ratio of net pay to gross pay. These maps are often constructed from seismic and well log data alone. Incorporating all available data, such as core analyses, seismic-guided reservoir property distributions and fluid analyses, and making certain that the reservoir model is consistent with these different types of data is a cost-effective way to stregthen and validate reservoir models across disciplines.

An iterative method to obtain a model that fits some of the data has been described by George W. Celniker in commonly-assigned U.S. Pat. No. 5,905,657, issued Mar. 18, 1999 and incorporated herein by reference. In the Celniker method, the user examines the difference between predicted and measured data, modifies the model attempting to decrease this difference, and repeats the procedure until the fit is satisfactory. This procedure may be adequate if all data sets are considered simultaneously, which may be impractical for diverse and large data sets. If instead the model is modified to fit each of the N data sets in turn (say, from $d^{(1)}$ to $d^{(N)}$, there is no guarantee that the modifications made to fit the ith data set $d^{(i)}$ do not make the model inconsistent with any of the data sets examined previously $(d^{(1)}, d^{(2)}, \ldots, d^{(i-1)})$. The model can be assured to be consistent with all data sets only by repeating the comparisons with each data set. Also, if a new data set is acquired and the model is modified to fit it, all other data sets must be examined again to ensure consistency. These repeated checks can make the method time-consuming and inefficient in practice. Moreover, an iterative comparison of predicted and measured data does not by itself quantify the uncertainty in the model (defined, e.g., as the range that the model parameters can span while still fitting the measured data).

BRIEF SUMMARY OF THE INVENTION

The invention comprises a parametric subsurface modeling method, apparatus, and article of manufacture that use measurement data to create a model of a subsurface area. The method includes the steps of: creating a parameterized model having an initial estimate of model parameter uncertainties; considering measurement data from the subsurface area; updating the model to fit the measurement data, the updated model having an updated estimate of model parameter uncertainties; and repeating the considering and updating steps with additional measurement data. A computer-based apparatus and article of manufacture for implementing the method are also disclosed. The method, apparatus, and article of manufacture are particularly useful in assisting oil companies in making hydrocarbon reservoir data acquisition and field development decisions. Features of the invention, preferred embodiments and variants thereof, possible applications and their advantages will become appreciated and understood by those skilled in the art from the following detailed description and drawings.

DETAILED DESCRIPTION OF THE INVENTION

Figure 1:
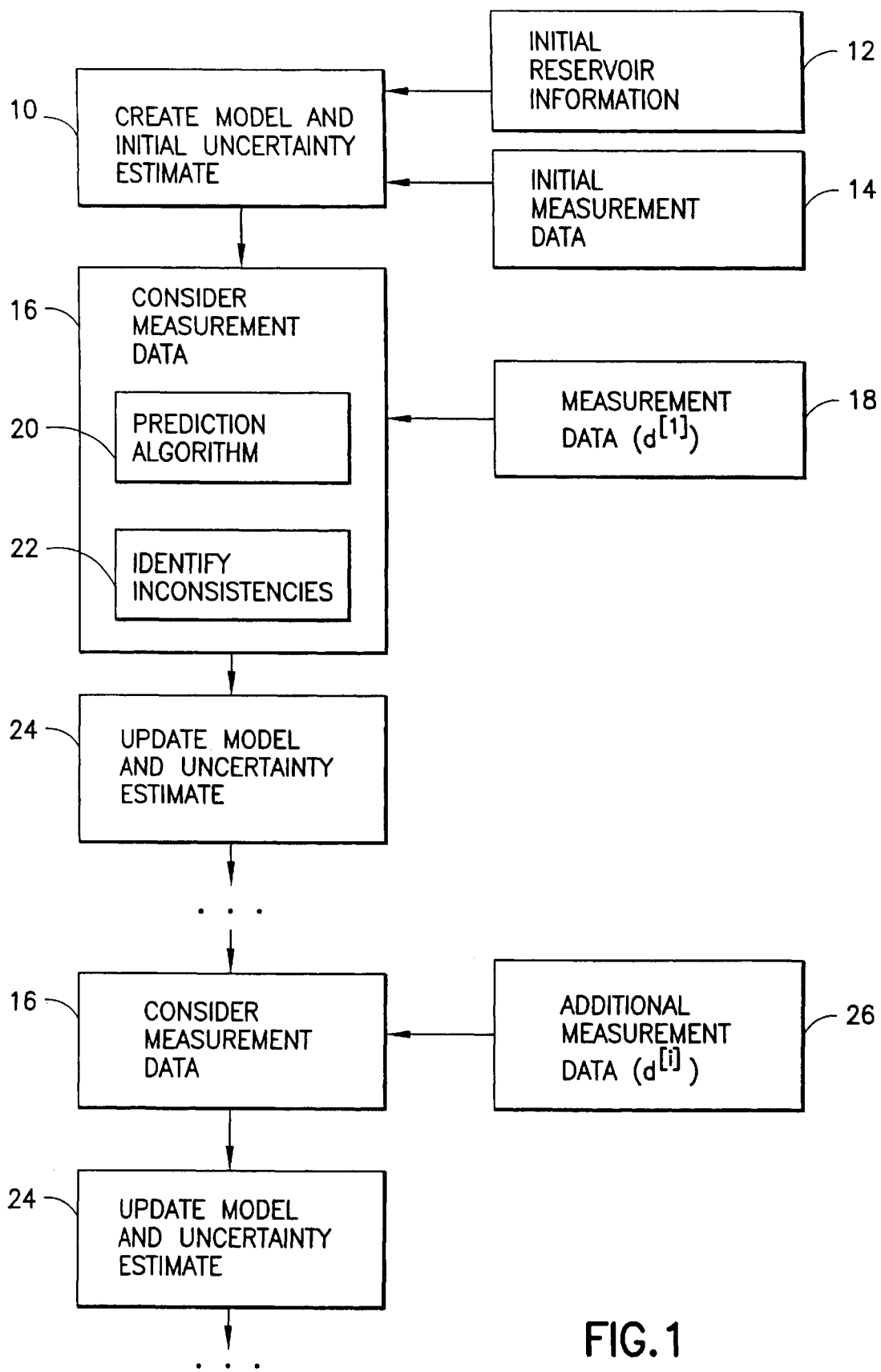
FIG. 1 is a flowchart showing steps associated with the present method, apparatus, and article of manufacture.

FIG. 1 shows several steps associated with the present method, apparatus and article of manufacture and provides a general overview of the invention. In the Create Subsurface Model Step 10, a parameterized model of a subsurface area is created using initial reservoir information 12 and/or initial measurement data 14. The initial parameterized model will have an associated initial estimate of model parameter uncertainties.

The model of the subsurface area will typically have geometrical model parameters representing geological boundaries and material parameters representing properties of distributed subsurface materials. The model of the subsurface area may be, for instance, a layered medium representing a layered earth with material properties that are constant or variable within each layer; a geocellular model having material property values defined on a regular or irregular three-dimensional grid; or may be a geometry-based model having material property values defined on a plurality of discrete geometrical sub-regions within the subsurface area.

The initial information may consist of prior knowledge of the spatial distribution of material properties in the subsurface, e.g., the increase of seismic velocity with depth. The initial information may come from physical laws or measurements made in subsurface areas other than the one being modeled. The initial measurement data may consist of seismic data, drilling data, well logging data, well test data, production history data, permanent monitoring data, ground penetrating radar data, gravity measurements, etc. or various combinations of these types of data.

The initial estimate of model parameter uncertainties will typically consist of probability density functions, and preferably consist of multivariate normal/lognormal probability density functions definable by mean vectors and covariance matrices.

In the Consider Measurement Data Step 16, Measurement Data 18 that provides information regarding the subsurface model parameters is examined. In certain cases, the Measurement Data 18 will provide information that may be compared directly to one or more of the subsurface model parameters. Well logging data may, for instance, give direct measurements of the thickness or the compressional seismic wave velocity of a given geologic layer. In other cases, a Prediction Algorithm 20 will be used to compute data predicted by the model that can be compared to Measurement Data 18, because the Measurement Data 18 only indirectly measures one or more of the subsurface model parameter values. Identify Inconsistencies 22 is used to flag those occasions when the Measurement Data 18 being considered is inconsistent with the model and its associated uncertainty estimate.

In the Update Model and Uncertainty Estimate Step 24, the model is updated to fit the Measurement Data 18 (typically within the model uncertainty constraints). The estimate of model parameter uncertainties is updated as well using the Measurement Data 18. The Consider Measurement Data Step 16, may for instance, produce a likelihood function that is combined with the initial estimate of model parameter uncertainties to produce both the updated parameterized model as well as the updated estimate of model parameter uncertainties. For example, the mean and covariance matrix of the updated estimate of model parameter uncertainties may be computed using deterministic optimization. Alternatively, one may use Monte Carlo sampling to obtain a number of models that are consistent with the Measurement Data 18. These samples may be used to compute the mean and covariance matrix of the updated model parameter uncertainties.

The Consider Measurement Data Step 16 and the Update Model and Uncertainty Estimate Step 24 are repeated for Additional Measurement Data 26 to produce a further updated parameterized model having a further updated estimate of model parameter uncertainties.

The Measurement Data 18 and the Additional Measurement Data 26 may, for instance, consist of different types of data, such as seismic data and well logging data. The Measurement Data 18 and the Additional Measurement Data 26 may, alternatively, consist of the same type of data that has been acquired from the subsurface area at different times to measure changes in reservoir, such as time-lapse/4D surface seismic data.

At least two additional alternative methods for managing the model update process are possible. In some cases, it may be preferable to allow the model parameters to be changed only when the change is consistent with the earlier estimate of model parameter uncertainties. In other cases, Identify Inconsistencies 22 may be used to identify changes in the model parameters that appear to be inconsistent with the initial estimate of model parameter uncertainties derived from the previously considered measurement data. This is generally an indication that model assumptions and data quality assumptions need to be re-examined.

The Consider Measurement Data Step 16 and the Update Model and Uncertainty Estimate Step 24 may be repeated as desired using Additional Measurement Data 26 to further update the model of the subsurface area and its associated estimate of model parameter uncertainties. This may be repeated, for instance, whenever a new set of Additional Measurement Data 26 from the subsurface area becomes available.

Figure 2:
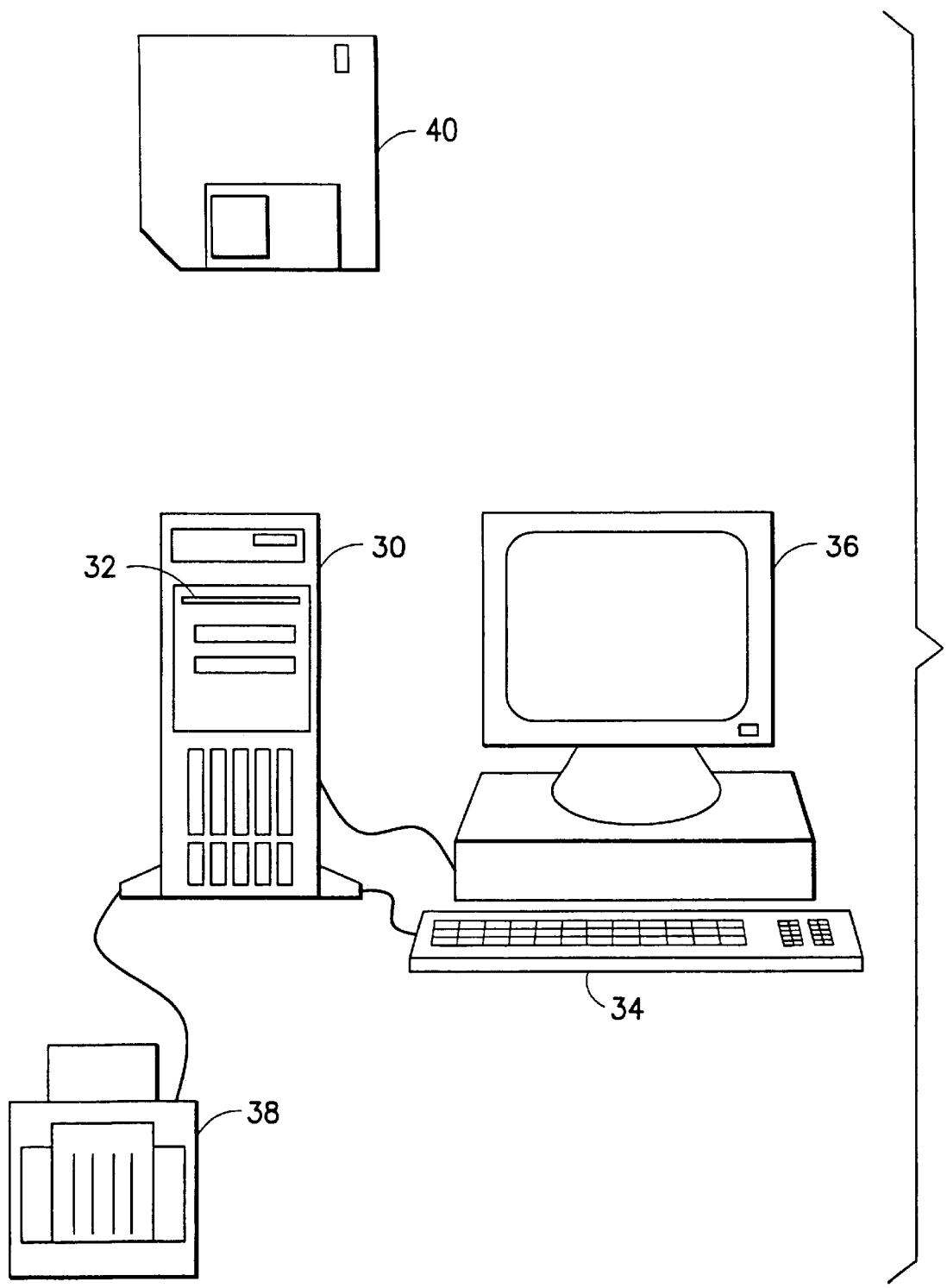
FIG. 2 is a schematic illustration of computer hardware associated with the apparatus and article of manufacture.

FIG. 2 schematically illustrates computer hardware that may be used to implement the inventive method. Computer 30 has a media reading device, such as floppy disk device 32, a CD-ROM Reader or a ZIP drive. The media reading device may also be capable of recording the output of the program the computer 30 is running. A user of the computer 30 may enter commands using a user input device, such as a keyboard 34 or a mouse, may view output of the program code on a visual display device, such as monitor 36, and may make hardcopies of output using an output device, such as printer 38. When properly configured, computer 30 (and its associated peripheral devices) is an apparatus for creating a model of a subsurface area in accordance with the present invention. Computer media, such as floppy disk 40, a CD-ROM or a ZIP disk, may have computer readable program code that allows the computer 42 to create a model of a subsurface area in accordance with the inventive method.

A preferred embodiment of the inventive method will now be described in substantially more detail. The inventive method addresses two primary issues: how to quantify uncertainties in a SEM given measurements and how to use these uncertainties to ensure consistent model updating. The latter is an important issue because in a SEM environment one should be able to continuously update the model; however, model updates based on a set of new data must be consistent with the information provided by data examined previously. We will now show how to generally address these issues using two simple examples where model uncertainties are calculated and updated using seismic and well data.

Figure 3:
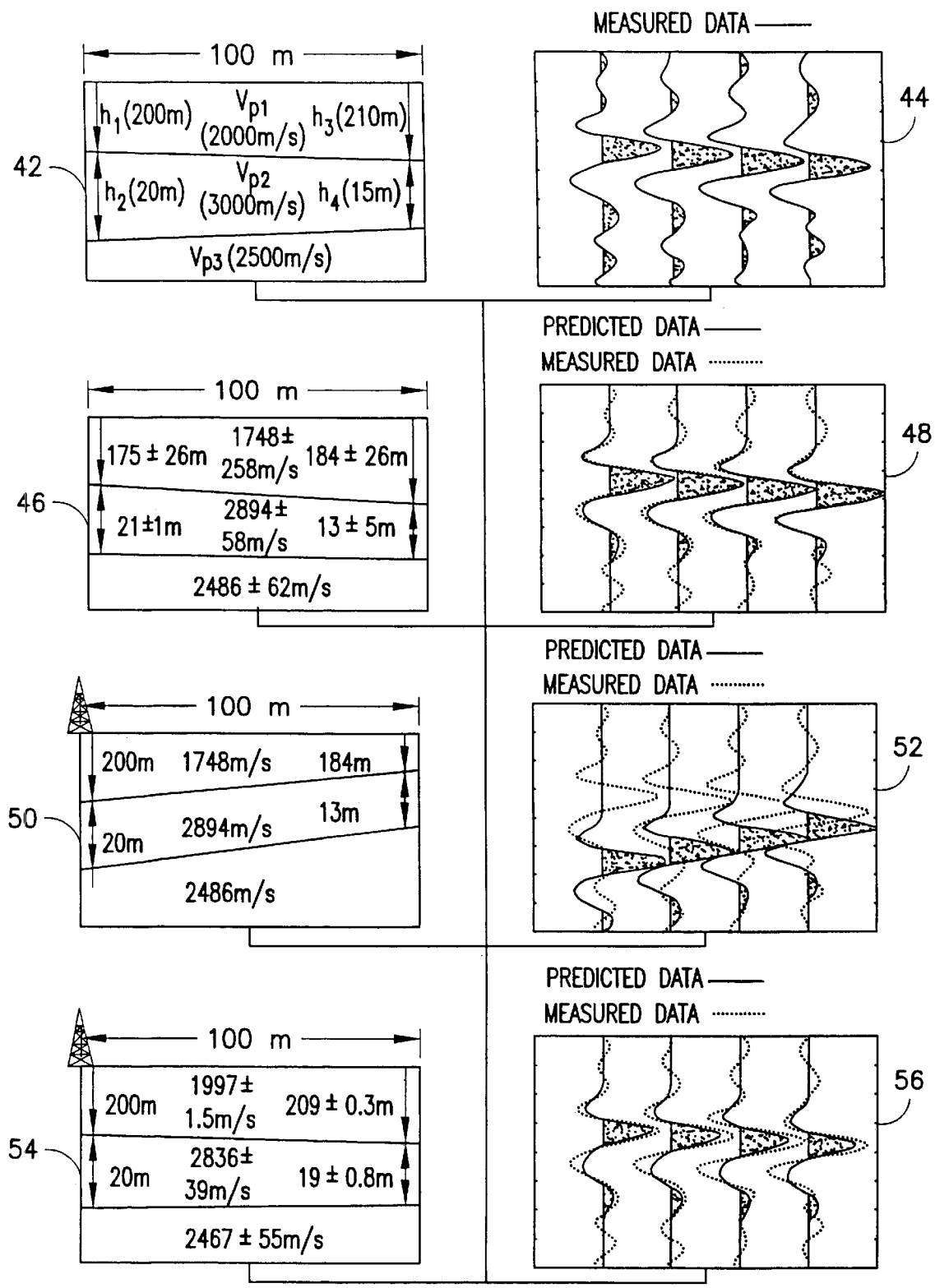
FIG. 3 is a related group of diagrams used to describe a first embodiment of the inventive method.

The first example will be used to illustrate the quantification of uncertainty in a multivariate normal distribution and consistent model updating environment and will use a simple two-dimensional SEM containing three layers (see FIG. 3, diagram 42). This model has seven parameters: the thicknesses $h_j$ of the two top layers at two locations define the SEM geometry, and three compressional wave velocities $V_{Pi}$ are material properties. We use layer thicknesses here rather than the absolute depths of horizons because thicknesses are better suited for optimization. Uncertainties in layer thickness can be easily transformed to uncertainties in absolute depths.

We suppose that at the outset there are measured surface seismic data in the form of four traces recorded at different locations (FIG. 3, diagram 44). These four traces were computed by convolving a 50-Hz seismic wavelet with the normal-incidence reflection coefficients of a 'true' model. The layer thicknesses and velocities in the true model are in parentheses in diagram 42. The densities needed to compute the reflection coefficients were obtained using Gardner's law, which gives rock density as a function of compressional wave velocity. To make the data more realistic, we added band-limited noise for a signal-to-noise ratio of 10.

Figure 5:
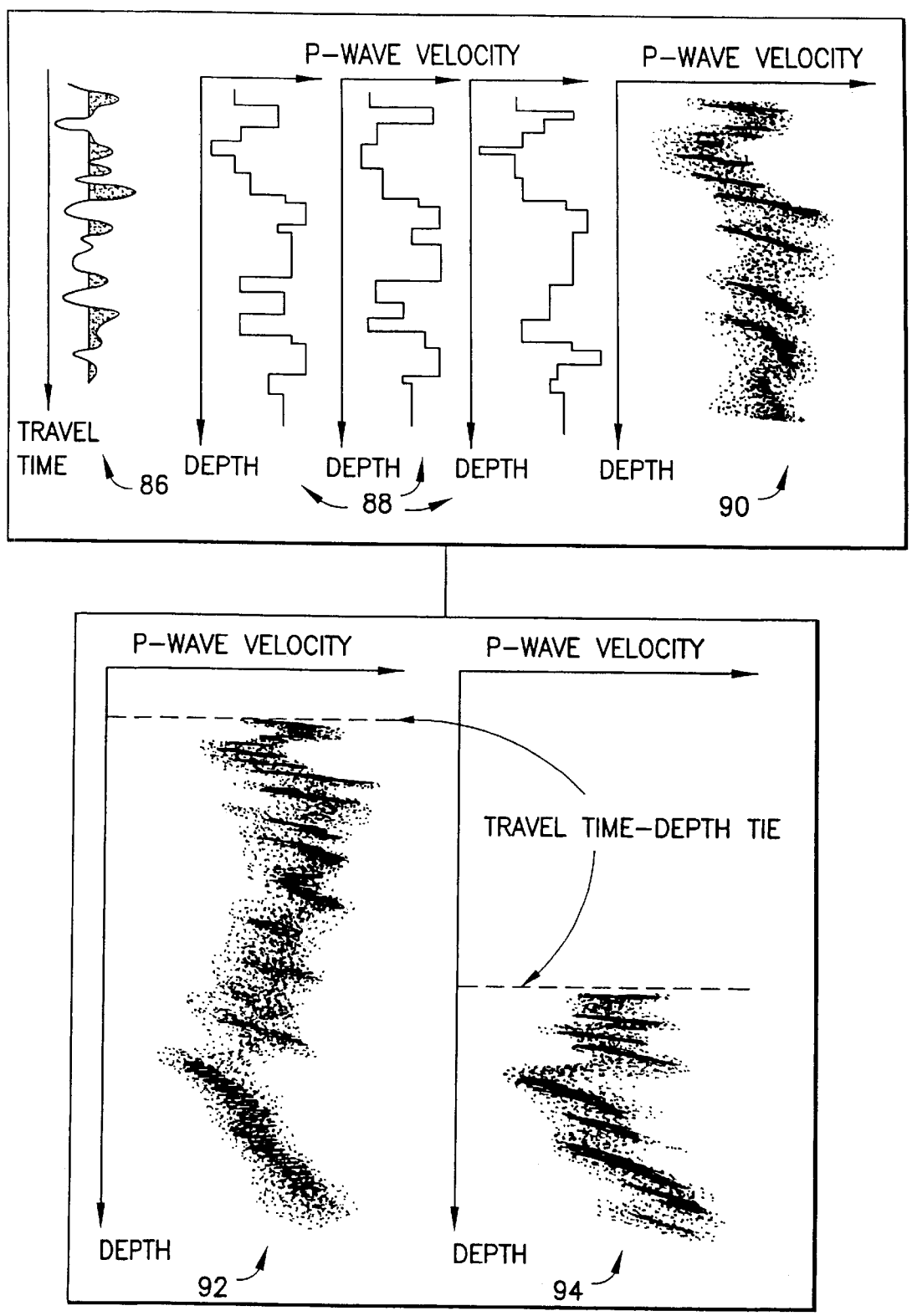
FIG. 5 is a related group of diagrams used to describe a second embodiment of the inventive method.

The second example, see FIG. 5, consists of a layered model and will be used to illustrate the quantification of uncertainty using a Monte Carlo method. The data consists of a single seismic reflection trace, and the uncertainty quantification problem is to infer how much variability in the layered medium parameters is consistent with the data given an assumed signal-to-noise ratio.

Quantifying SEM Uncertainty from Measurements

Figure 4:
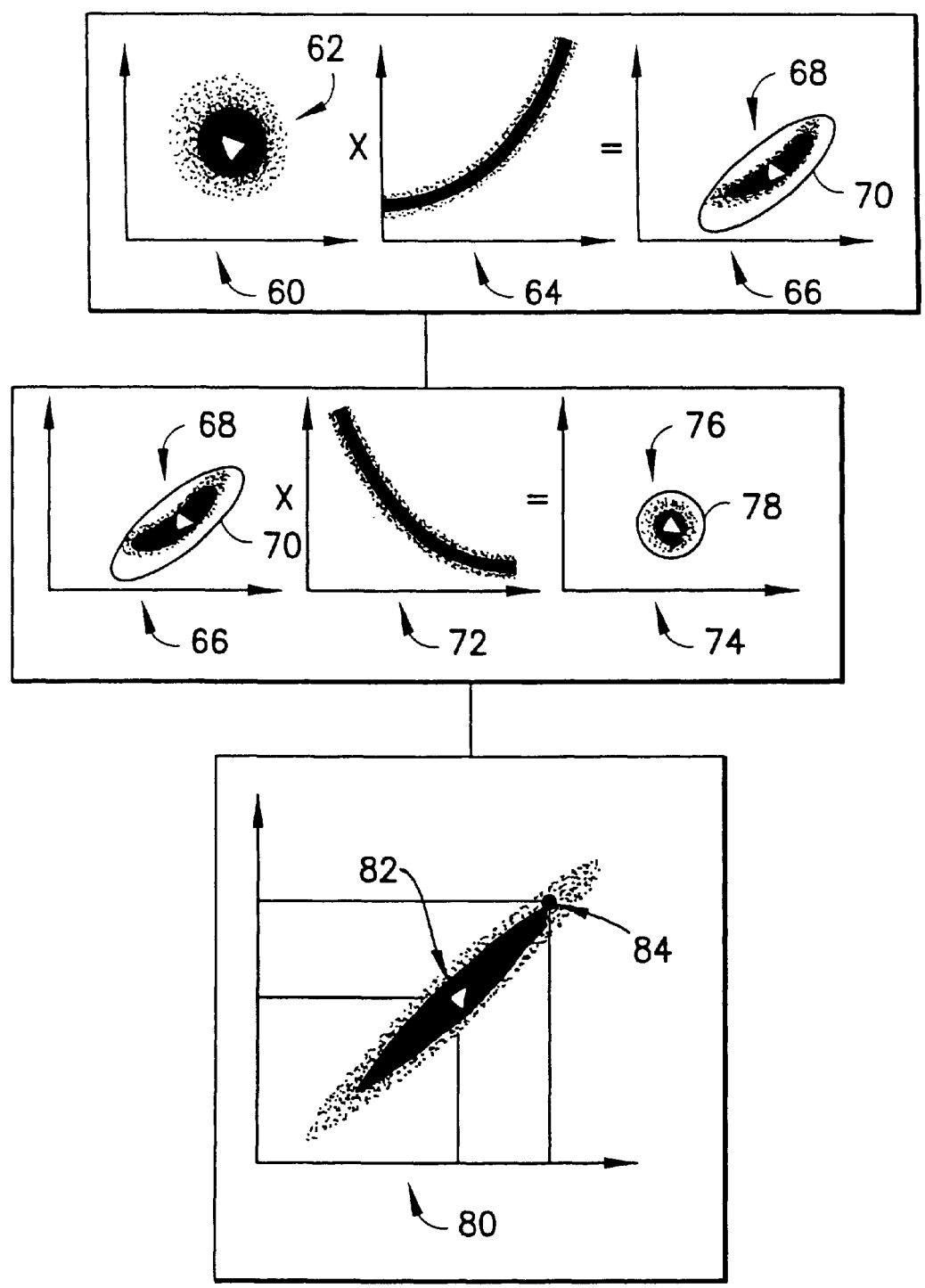
FIG. 4 is a related group of diagrams used to describe the first embodiment of the inventive method.

To quantify uncertainty, we use the Bayesian approach widely adopted in the statistical and geophysical inversion literature. Denote the SEM parameters with a vector $m=[m_1, m_2, \ldots, m_M]^T$ and the seismic data with a vector $d=[d_1, d_2, \ldots, d_N]^T$ (we use bold lowercase letters for vectors and bold uppercase letters for matrices; the superscript T denotes the transpose). The final uncertainty is quantified by a posterior probability density function (PDF) of the model parameters in m, which can be obtained from Bayes' rule as the product of a prior PDF and a likelihood function (FIG. 4, diagrams 60–74):

$$p(m|d, I) \propto p(m|I)L(m|d, I),$$

where p(m|d, I) is the posterior PDF (the PDF of the SEM parameters m given the data d, p(m|I) is the prior PDF, L(m|d, I) is the likelihood function, and α denotes proportionality. It might seem an impossible task to write an expression for the model PDF given the poor state of knowledge of the reservoir. This is possible by making the PDFs conditional on some prior information I, which includes the parametric form of the model, the noise model, and the accuracy of the physics and simulators used to predict the measurements for a given value of the model parameters.

The prior PDF quantifies what is known about the model parameters from the prior information only, i.e., independently of the information provided by the data. For the initial SEM of diagram 42, we used as a prior PDF a uniform distribution for the layer thicknesses (between a minimum of 1 m and a maximum of 400 m) and a normal distribution for the compressional wave velocities (with a mean of 2500 m/s, a standard deviation of 500 m/s, a minimum of 1500 m/s and a maximum of 5000 m/s). Prior uncertainties in the SEM parameters were also assumed to be independent, so that the prior PDF of all parameters is just the product of the prior PDFs of each:

$$p(m|I) = p(m_1|I)p(m_2|I) \ldots p(m_7|I)$$

This prior PDF represents an initial state of information where the layer thicknesses are unknown, while the prior PDF of the velocities reflects what is expected for sedimentary rocks.

Information provided by measurements is quantified by the likelihood function, which is formally the probability of observing the data d when the model parameters equal m. For the data of diagram 44, we assumed from prior information that the measured data contained measurement errors that were normally distributed with a standard deviation σ. The likelihood function is then $$L(m|d, I) \propto \exp\{-[1/(2\sigma^2)][d-g(m)]^T[d-g(m)]\},$$

where g(m) is a forward modeling (i.e. simulation, prediction) operator that returns the value of the data calculated for a given value of the SEM parameters. In our case, this operator gives the data computed by convolving a seismic wavelet (assumed known) with the reflection coefficient sequence corresponding to the parameters in the SEM. The combination of the prior and likelihood tells us what we know about the model parameters a posteriori.

Diagrams 60 through 74 show how to update a posterior PDF when new data become available. In the first row, a posterior PDF is obtained when there are only data $d^{[1]}$. When more data become available, indicated by $d^{[2]}$, the posterior PDF as constrained by all the data can be obtained by applying Bayes' rule again while using as the prior PDF the posterior obtained previously. This simple update can be done if errors in the data $d^{[1]}$ and $d^{[2]}$ independent, which is a reasonable assumption for data of different types.

Diagrams 60 through 74 also illustrate how uncertainty can be quantified. At any stage in the process, the posterior PDF can be approximated by a multivariate normal distribution as in $$p(m|d, I) = \text{const.} \exp[-(1/2)(m-\mu)^T C^{-1}(m-\mu)].$$

In this approximation, the posterior PDF is fully described by the mean value of the model parameters μ and by the covariance matrix C. The mean (indicated by the white triangles 62, 68, and 76 in diagrams 60, 66, and 74) gives a most probable, 'best' value of the SEM parameters; the covariance matrix defines an ellipsoid in parameter space describing the shape of the posterior PDF (the ellipses 70 and 78 in diagrams 66 and 74), an indication of model parameter uncertainty.

A general practical recipe to evaluate μ and C uses nonlinear optimization of an objective function $$\Phi(m) = \log p(m|d, I).$$

A generic optimizer (e.g., quasi-Newton) can be used to find the maximum of the objective function, and the value of m at the maximum can be taken to correspond to the posterior mean μ. The posterior covariance matrix C can be computed as the inverse of the Hessian matrix (the matrix of second derivatives) of the objective function evaluated by finite differences around μ.

The result of applying the nonlinear optimization procedure to the SEM and data of diagrams 42 and 44 is illustrated in diagrams 46 and 48. While the seismic data predicted by the best values of the SEM match closely the measured data, there are large uncertainties in the layer thicknesses and wave velocity in the top layer. This illustrates the fundamental non-uniqueness of time-depth conversion: increasing simultaneously thickness and wave velocity in the top layer does not change the travel time of the reflection. The data do not constrain well the combination of layer thickness and wave velocity, and this uncertainty has been captured in the posterior covariance.

Generic optimization algorithms are typically 'local', in the sense that they find a maximum by moving toward higher values of the objective function from a starting point. Therefore, if the objective function has multiple maxima (as often is the case for band-limited seismic data), the optimizer may converge to a meaningless local maximum. If there are multiple local maxima, these optimizers will converge to the global maximum only if they start from a value of m that is close to (in the sense of being downhill from) that maximum. For these optimizers to be useful in practice, the user should have the capability to search for a reasonably good starting point by trial-and-error interactions with the SEM.

The uncertainties computed from the Hessian matrix are also 'local' because they are obtained from the local curvature of the objective function near its maximum. The uncertainties computed in this fashion will be accurate only if the objective function is well approximated by a quadratic, i.e., if the posterior PDF is well approximated by a multivariate normal distribution. An alternative is to use a Monte Carlo sampling strategy where values of the model parameter vector m are sampled from the posterior PDF. While uncertainties computed from the Hessian matrix are likely to be useful in many instances, there may be cases where a Monte Carlo approach is necessary to obtain a sufficiently accurate uncertainty quantification.

The Monte Carlo approach is illustrated in the example of FIG. 5. The data d 86 are seismic reflection data, and the model parameters in the vector m are $$m = (n, t, v),$$

where n is the number of layers, t is a vector of travel times to the layer interfaces, and v is a vector of compressional wave velocities or acoustic impedances in each of the layers.

The three profiles 88 are obtained by sampling the posterior PDF of the parameters using a Monte Carlo algorithm. In practice, this can be done in two steps: first obtain a sample of layered media in travel time from the posterior PDF, and then convert each of the sampled layered media from travel time to depth starting from a travel time-depth tie (a point where the travel time and depth are known or have been measured). The image 90 is obtained by superimposing a large number of layered media sampled from the posterior PDF and gives an image of the uncertainty in compressional wave velocity with depth for a given travel time-depth tie.

A method that may be used to obtain a sample from the posterior PDF is the Metropolis-Hastings algorithm. Each step of the algorithm consists of choosing a "candidate" layered medium by perturbing the current one (e.g., by adding a layer, deleting a layer, or changing the travel time to a layer interface). This amounts to choosing a candidate parameter vector m' from a "candidate PDF" q(m'|m), that is the distribution of possible candidates given the current value m of the parameter vector. In the Metropolis-Hastings algorithm, the candidate is accepted with probability $$\text{alpha}=\min\{1,[p(m'|d,I)/p(|d,I)][q(m|m')/q(m'|m)]\}.$$

It can be shown that a sequence of models obtained with this simple algorithm will eventually sample the posterior PDF p(m|d, I). Once a sample of layered media is obtained, it is easy to convert travel time to depth by starting from a known travel time-depth tie and computing the thickness of the i-th layer $h_i$ as $$h_i = \text{delta} t_i\, v_i/2,$$

where $\text{delta} t_i$ is the thickness of the i-th layer in travel time and $v_i$ is the velocity of the i-th layer.

The Monte Carlo approach provides a more detailed and accurate quantification of uncertainty compared to the multivariate normal distribution method described above. A Monte Carlo approach such as that shown in FIG. 5 accounts for the possibility of having different number of layers in the reservoir model and captures the uncertainty of posterior PDFs that are not well approximated by a normal distribution. For example, FIG. 5 shows that the PDF of compressional wave velocity at a given depth may be multimodal. If a description of uncertainty in terms of a multivariate normal distribution is needed, however, it is easy to compute a posterior mean $\mu$ and a posterior covariance matrix C from the result of Monte Carlo sampling.

Using SEM Uncertainty for Consistent Model Updating

The uncertainties computed and displayed in diagram 46 are obviously useful in that they quantify how well the seismic data constrain each parameter of the SEM. Uncertainties also provide a 'memory' to the model: if information on the covariance matrix were stored with the model, it would effectively remember the constraints placed by all the data types that the model was tested against.

The most general way to update the model and its uncertainty when new data become available is illustrated in diagrams 60 through 74, and consists of a repeated application of Bayes' rule. In this section we describe two methods that can be used to quickly accomplish model updating and that can be used when new data becomes available (e.g., from a well) to update a SEM whose uncertainty has been quantified using a multivariate normal distribution or the Monte Carlo approach.

An important use of quantified uncertainty is in propagating model updates to ensure consistency of the SEM with previously examined data. We illustrate the first method for consistent model updating, which is applicable when the uncertainty is quantified in a multivariate normal PDF form, by considering what happens when new information from a well becomes available. The simplest update is illustrated in diagrams 50 and 52: when observations from a well drilled at the left edge of the SEM show that the thicknesses of the top two layers are 200 m and 20 m, the model is simply updated to reflect the new information.

If layer thicknesses in the model of diagrams 46 and 48 are changed to reflect values observed at a well without changing any other SEM parameters, the predicted seismic data do not match anymore the measured data. To ensure consistency, one would have to match the model to the seismic data again after the update.

In the case of time-depth conversion this is not unrealistic, and the consequences of changes in layer thicknesses can be calculated in a straightforward way. But in the general case where a SEM has been constrained by a variety of data, there is no obvious way to compute how the effects of a local update should be propagated to maintain consistency.

We now describe a simple mechanism where quantified uncertainties are used to propagate the effects of a local model update to ensure consistency of a SEM with data examined previously. The mechanism uses the transmission of information provided by Bayes' rule (diagrams 60 through 74) and is illustrated in diagram 80. After considering only the seismic data, diagram 80 shows as a shaded ellipse the posterior PDF of the compressional wave velocity V, and thickness h of a layer; the best value of $V_P$ and h is shown as a white triangle 82. Suppose now that, as shown in diagrams 50 and 52, new information from a well becomes available and it is now known that the layer thickness must be within a narrow interval, indicated by the narrow cross-hatched rectangle in chart 80. The best value for $V_P$ and h given the well data is now located at dot 84, which is the point within the narrow rectangle where the posterior PDF given the seismic data only is greatest. Note that the information from the seismic data specifies that if the best value of the layer thickness changes, the best value of the layer wave velocity must change as well.

At the limit where the layer thickness is fixed with absolute certainty by the well observations (i.e., the rectangle in chart 80 shrinks to a vertical line), the operation illustrated in chart 80 is the calculation of the conditional mean of $V_P$ for a given value of h. In the general case where one wants to compute the mean of some model parameters conditional on other model parameters that have been updated, this calculation is straightforward. Start by rearranging the vector of SEM parameters m into two vectors $$m = \begin{bmatrix} m_1 \\ m_2 \end{bmatrix},$$

where the vector $m_1$ contains the parameters whose conditional mean is to be computed, and the vector $m_2$ contains the parameters that are fixed. In the example of FIG. 3, diagrams 50 and 52, $m_2$ would contain the two layer thicknesses constrained by the well observations and $m_1$ the two other layer thicknesses and the three wave velocities. After considering some data (seismic data in the example of FIG. 3, diagrams 50 and 52), suppose we have a multivariate normal posterior PDF for m with mean $\mu$ and covariance C. Rearrange the mean vector as done for m in two vectors $\mu_1$ and $\mu_2$ and the covariance matrix as $$C = \begin{bmatrix} C_{11} & C_{12} \\ C_{12}^T & C_{22} \end{bmatrix}.$$

It can be shown that the mean of the parameters in $m_1$ conditional on the other parameters having a value $m_2$ is $$\mu_1 + C_{12}C_{22}^{-1}(m_2 - \mu_2)$$

and the conditional covariance of the parameters in $m_1$ is $$C_{11} - C_{12}C_{22}^{-1}C_{12}^T.$$

This approach can be easily applied to the example of FIG. 3, diagrams 50 and 52. FIG. 3, diagrams 54 and 56 show the result of adding the well data using a 'consistent' model update, i.e., computing the mean and covariance of the seismically-defined SEM parameters conditional on the two values of thickness observed at the well. In simple terms, this is a consistent update because it uses the information provided by the seismic data to propagate the effects of a local model update done on the basis of well data to other model parameters in order to preserve consistency with the seismic data. For example, the seismic data imply that if the thickness of the top layer is modified, the wave velocity must change as well. The conditional value computed from the uncertainty for the top layer wave velocity is 1997 m/s, which is very close to the true value (2000 m/s; see diagrams 42 and 54).

Diagrams 54 and 56 also show that the data predicted by the updated SEM match the measurements well, in contrast with the SEM of diagrams 50 and 52. It is important to stress that this close match has not been achieved by comparing the SEM predictions with the seismic data again after the well data were incorporated in the model. The good fit to the measurements is simply a result of using the posterior PDF to compute a consistent model update. This is the key advantage of quantifying uncertainties; at first approximation, the effects of any update to the SEM can be propagated using the posterior uncertainties without needing to re-examine all data previously incorporated into the model. The posterior uncertainties are a 'memory' mechanism that allows the SEM to remember how closely data constrain its geometries and material property distributions.

The limitations of this mechanism follow from the limitations on the quantification of uncertainty noted in the previous section. If the multivariate normal representation we use here does not approximate the posterior PDF closely, the computed consistent update will suffer. In our example, it is clear that while the seismic data predicted by the consistently updated SEM are close to the measurements, the fit may be improved (compare diagrams 54 and 56 with diagrams 46 and 48). Also, some uncertainties are smaller than they should be; for example, the uncertainty in the thickness of the second layer should be greater than 0.8 m.

On the other hand, the updated model should be close to the best value and thus an automated optimization applied at this stage should have a good chance of succeeding. Starting from the model of diagrams 50 and 52, an optimization converges to a meaningless local maximum; if one starts instead from the consistently updated model of diagrams 54 and 56, the optimization quickly converges to a best model with an improved fit to the seismic data. Once the best model is found, the posterior covariance matrix may be evaluated again for more accurate uncertainty quantification.

In the previous section we also described a Monte Carlo approach to quantify uncertainty. If the model uncertainty is quantified in a multivariate normal distribution whose mean $\mu$ and covariance matrix C are evaluated from the result of Monte Carlo sampling, the consistent update method we have illustrated above can be used to compute a quick update, i.e. without requiring the Monte Carlo sampling process to be repeated. We now illustrate a second method that uses additional information to directly update the sample from the posterior PDF obtained by a Monte Carlo method.

The method we describe can be applied when the additional information that becomes available directly controls the properties of the posterior PDF sample. In the example of FIG. 5, diagrams 86–90, a Monte Carlo method was used to obtain a sample from the posterior PDF of the thicknesses and compressional wave velocities in a layered medium. Because the seismic reflection data are in travel time, obtaining a layered medium description in depth requires having a travel time-depth tie, that is, having a point where the absolute depth and the corresponding travel time are known or measured. This travel time-depth tie may be the Earth's surface, where depth and travel time are zero. For offshore reservoirs, the travel time-depth tie may be at the sea bottom. If the seismic data were acquired using receivers or sources in a borehole, the travel time-depth tie may be obtained at the depth of a receiver/source in the borehole. As will be clear to those skilled in the art, the uncertainty in the depth of a layer as determined from seismic reflection data is greater the farther away the layer is from the deepest travel time-depth tie. This is because depth is the sum of layer thicknesses starting from the deepest travel time-depth tie; the uncertainty in depth is the cumulative uncertainty of the layer thicknesses.

Diagrams 92 and 94 illustrate our method of updating a layered model and its uncertainties as new information on travel time-depth ties becomes available. Diagram 92 shows the results of Monte Carlo sampling obtained for a relatively shallow travel time-depth tie (e.g. the Earth's surface, the sea floor, the depth of a seismic receiver/source in a borehole). The results are presented in the form of a posterior image (as in diagram 90) computed by superimposing all the layered media sampled by the Monte Carlo method. As noted in the previous section, in practice the Monte Carlo sampling obtains a sample of layered media in travel time, rather than depth; each of these layered media is then converted to depth using a known/measured travel time-depth tie.

Diagram 94 illustrates how the uncertainty in depth changes if a deeper travel time-depth tie is measured. This additional travel time-depth tie will typically be provided by a seismic receiver/source placed in a borehole, and it could be acquired during or after drilling the well. Diagram 94 shows how the uncertainty in deep layers is reduced by using the deeper travel time-depth tie. It should be stressed that the application of this method does not require sampling the posterior PDF again, but simply using the same sample of layered media in travel time obtained earlier while recomputing the travel time to depth conversion for the additional, deeper travel time-depth tie. This reduction in uncertainty can be extremely important in making decisions during the drilling of a well (e.g., on determining the depth of zones that have anomalous pore pressures and are drilling hazards).

Uncertainty quantification and consistent model updating can improve significantly the efficiency of constructing and modifying a SEM. Because industry-standard interpretation workflows don't account for uncertainty, model consistency is maintained by making elements of the model 'rigid' as the interpretation progresses down the workflow. The term 'rigid' means here that once a domain expert has set the optimal values for parameters under his control (e.g., a geophysicist interpreting the model framework), these values are not changed by later experts (e.g., a reservoir engineer) for fear that the model will no longer be consistent with the previous data. For example, once the model framework is fixed, the reservoir engineer is only left flow parameters to adjust during history matching. Explicitly accounting for uncertainty would allow that same reservoir engineer to adjust all parameters of the model within their acceptable ranges to obtain the best history match. The remaining uncertainty in the model then provides input to decision-making tools which, for example, can be used to estimate a PDF of the net present value of a reservoir. Thus, uncertainty quantification allows us to approach the ideal of a SEM that is constrained by as many data as possible, can be easily updated, and ties directly into decision-making tools.

The foregoing description of the preferred and alternate embodiments of the present invention have been presented for purposes of illustration and description. It is not intended to be exhaustive or limit the invention to the precise examples described. Many modifications and variations will be apparent to those skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

We claim:

1. A method of using measurement data to create a model of a subsurface area comprising the steps of:
    creating a parameterized model of the subsurface area having an initial estimate of model parameter uncertainties;
    considering measurement data from the subsurface area;
    updating said parameterized model to fit said measurement data, said updated parameterized model having an updated estimate of model parameter uncertainties; and
    repeating said considering and updating steps with additional measurement data to produce a further updated parameterized model having a further updated estimate of model parameter uncertainties.

2. A method according to claim 1, wherein said model of the subsurface area has geometrical model parameters representing geological boundaries.

3. A method according to claim 1, wherein said model of the subsurface area has material parameters representing properties of distributed subsurface materials.

4. A method according to claim 1, wherein said measurement data comprise seismic data, drilling data, well logging data, well test data, production history data, or permanent monitoring data.

5. A method according to claim 1, wherein said measurement data and said additional measurement data comprise different types of data.

6. A method according to claim 5, wherein said measurement data comprises seismic data and said additional measurement data comprises well logging data.

7. A method according to claim 1, wherein said parameterized model of the subsurface area comprises a layered model having material properties associated with each layer.

8. A method according to claim 1, wherein said parameterized model of the subsurface area comprises a geocellular model having material property values defined on a regular or irregular three-dimensional grid.

9. A method according to claim 1, wherein said parameterized model of the subsurface area comprises a geometry-based model having material property values defined on a plurality of discrete geometrical sub-regions within the subsurface area.

10. A method according to claim 1, wherein said initial and updated estimates of model parameter uncertainties comprise probability density functions computed using deterministic optimization or Monte Carlo sampling.

11. A method according to claim 10, wherein said probability density functions are multivariate normal probability density functions definable by mean vectors and covariance matrices.

12. A method according to claim 11, wherein a mean and covariance matrix of said updated estimate of model parameter uncertainties is computed using deterministic optimization or Monte Carlo sampling.

13. A method according to claim 1, wherein said considering step comprises comparing said measurement data to a model parameter, said updating step comprises updating said parameterized model to fit said measurement data, and said updating step further comprising updating said initial estimate of model parameter uncertainties to be consistent with uncertainties associated with said measurement data.

14. A method according to claim 1, wherein said considering step comprises comparing said additional measurement data to predicted data produced by a prediction algorithm operating on said initial parameterized model.

15. A method according to claim 1, wherein said considering step produces a likelihood function that is combined with said initial estimate of model parameter uncertainties to produce said updated estimate of model parameter uncertainties.

16. A method according to claim 1, wherein said updating step comprises directly updating a sample from a posterior PDF obtained by a Monte Carlo method using said measurement data.

17. A method according to claim 1, wherein said updating step comprises directly updating said sample using travel time-depth measurement data obtained while drilling.

18. A method according to claim 1, wherein said parameterized model parameters may be changed during said updating step only when said change is consistent with said initial estimate of model parameter uncertainties.

19. A method according to claim 1, wherein any changes to said parameterized model parameters that are inconsistent with said initial estimate of model parameter uncertainties are identified during said updating step.

20. An apparatus for creating a model of a subsurface area comprising:
    means for creating a parameterized model of the subsurface area having an initial estimate of model parameter uncertainties;
    means for considering measurement data from the subsurface area;
    means for updating said parameterized model to fit said measurement data, said updated parameterized model having an updated estimate of model parameter uncertainties; and
    means for repeating said considering and updating steps with additional measurement data to produce a further updated parameterized model having a further updated estimate of model parameter uncertainties.

21. An article of manufacture, comprising:
a computer usable medium having a computer readable program code means embodied therein for creating a model of a subsurface area, the computer readable program code means in said article of manufacture comprising:
  computer-readable program means for creating a parameterized model of the subsurface area having an initial estimate of model parameter uncertainties;
  computer-readable program means for considering measurement data from the subsurface area;
  computer-readable program means for updating said parameterized model to fit said measurement data, said updated parameterized model having an updated estimate of model parameter uncertainties; and
  computer-readable program means for repeating said considering and updating steps with additional measurement data to produce a further updated parameterized model having a further updated estimate of model parameter uncertainties.

* * * * *